United States Patent
Fung et al.

(10) Patent No.: US 9,752,892 B2
(45) Date of Patent: Sep. 5, 2017

(54) METHODS AND SYSTEMS FOR ACQUIRING SENSOR DATA ON A DEVICE USING MULTIPLE ACQUISITION MODES

(71) Applicant: Google Inc., Mountain View, CA (US)

(72) Inventors: James Fung, Mountain View, CA (US); Joel Hesch, Mountain View, CA (US); Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 670 days.

(21) Appl. No.: 14/185,176

(22) Filed: Feb. 20, 2014

(65) Prior Publication Data

US 2015/0233743 A1 Aug. 20, 2015

(51) Int. Cl.
*G01D 21/02* (2006.01)
*G01C 23/00* (2006.01)

(52) U.S. Cl.
CPC .................................... *G01C 23/00* (2013.01)

(58) Field of Classification Search
CPC .......... G01D 21/02; G01C 23/00; G06F 9/00; H04B 1/38
See application file for complete search history.

(56) References Cited

U.S. PATENT DOCUMENTS

2012/0058801 A1* 3/2012 Nurmi .................. G06T 19/006
455/566
2012/0324213 A1* 12/2012 Ho ........................ G06F 1/1626
713/100

OTHER PUBLICATIONS

Dubois et al., Embedded Co-Processor Architecture for CMOS Based Image Acquisition, 2003 IEEE, pp. 591-594.*

* cited by examiner

*Primary Examiner* — Toan Le

(57) ABSTRACT

Methods and systems for acquiring sensor data using multiple acquisition modes are described. An example method involves receiving, by a co-processor and from an application processor, a request for sensor data. The request identifies at least two sensors of a plurality of sensors for which data is requested. The at least two sensors are configured to acquire sensor data in a plurality of acquisition modes, and the request further identifies for the at least two sensors respective acquisition modes for acquiring data that are selected from among the plurality of acquisition modes. In response to receiving the request, the co-processor causes the at least two sensors to acquire data in the respective acquisition modes. The co-processor receives first sensor data from a first sensor and second sensor data from a second sensor, and the co-processor provides the first sensor data and the second sensor data to the application processor.

20 Claims, 12 Drawing Sheets

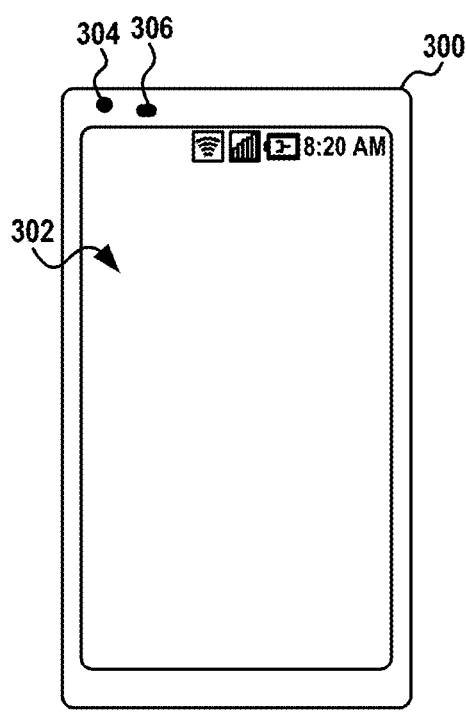
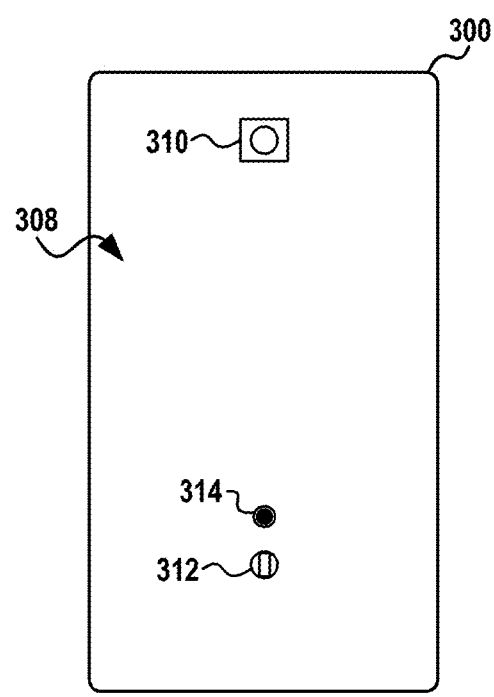
FIG. 3A  FIG. 3B

| LINE / ROW | |
|---|---|
| 0 - 15 | SENSOR DATA — 902 |
| 16 - 30 | COMPUTER-VISION DATA — 904 |
| 31 - 510 | FIRST (WIDE-ANGLE) CAMERA DATA<br>640 x 480 — 906 |
| 511-690 | DEPTH DATA<br>320 x 180 — 908 |
| 691 - 1170 | SECOND CAMERA DATA<br>640 x 480 — 910 |

|  |  |  |  |  |  |  | SENSOR DATA |  |  | COMPUTER-VISION DATA |  |
|---|---|---|---|---|---|---|---|---|---|---|---|
| LINE | PIXEL 0 (Y) | PIXEL 1 (Y) | PIXEL 2 (Y) | PIXEL 3 (Y) | PIXEL 4 (Y) | PIXEL 5 (Y) | ... |  |  |  |  |
| 0 | ACCEL_X_H | ACCEL_X_L | ACCEL_Y_H | ACCEL_Y_L | ACCEL_Z_H | ACCEL_Z_L | ... |  |  |  |  |
| 1 | GYRO_X_H | GYRO_X_L | GYRO_Y_H | GYRO_Y_L | GYRO_Z_H | GYRO_Z_L | ... |  |  |  |  |
| 2 | MAG_X_H | MAG_X_L | MAG_Y_H | MAG_Y_L | MAG_Z_H | MAG_Z_L | ... |  |  |  |  |
| 3 | BARO_B3 | BARO_B2 | BARO_B1 | BARO_B0 |  |  | ... |  |  |  |  |
| 4 | TEMP_I_H | TEMP_I_L | TEMP_F_H | TEMP_F_L |  |  | ... |  |  |  |  |
| 5 | TIMESTAMP_B3 | TIMESTAMP_B2 | TIMESTAMP_B1 | TIMESTAMP_B0 |  |  | ... |  |  |  |  |
| ... | ... | ... | ... | ... | ... | ... | ... |  |  |  |  |
| 16 | FEATURE1_B3 | FEATURE1_B2 | FEATURE1_B1 | FEATURE1_B0 | FEATURE2_B1 | FEATURE2_B0 | ... |  |  |  |  |
| ... | ... | ... | ... | ... | ... | ... | ... |  |  |  |  |

FIG. 10

Computer Program Product 1100

Signal Bearing Medium 1101

Program Instructions 1102

- receive a request for sensor data, wherein the request identifies at least two sensors of a plurality of sensors for which data is requested, wherein the at least two sensors are configured to acquire data using a plurality of acquisition modes, and wherein the request identifies for the at least two sensors respective acquisition modes for acquiring data selected from among the plurality of acquisition modes;

- in response to receiving the request, cause the at least two sensors to acquire data in the respective acquisition modes;

- receive by an application processor first sensor data acquired using a first sensor of the at least two sensors and second sensor data acquired using a second sensor of the at least two sensors.

| Computer Readable Medium 1103 | Computer Recordable Medium 1104 | Communications Medium 1105 |

FIGURE 11

METHODS AND SYSTEMS FOR ACQUIRING SENSOR DATA ON A DEVICE USING MULTIPLE ACQUISITION MODES

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging and positioning. A few examples of sensors that may be found in a mobile device include accelerometers, gyroscopes, magnetometers, barometers, global positioning system (GPS) receivers, microphones, cameras, Wi-Fi sensors, Bluetooth sensors, temperature sensors, and pressure sensors, among other types of sensors.

The wide variety of available sensors enables mobile devices to perform various functions and provide various user experiences. As one example, a mobile device may use imaging and/or positioning data to perform an odometry process (i.e., determining a position and orientation of the mobile device in an environment). As another example, a mobile device may use imaging and/or positioning data to generate a 2D or 3D map of an environment, or determine a location of a mobile device within a 2D or 3D map of an environment. As yet another example, a mobile device may use imaging and/or positioning data to facilitate augmented reality applications. Other examples also exist.

SUMMARY

Described herein are methods and systems for controlling operation of a plurality of sensors of a device. Within examples, the plurality of sensors may be configured to acquire data using a plurality of acquisition modes. Depending on a desired configuration and operation of the device, a processor may cause the sensors to acquire data in particular acquisition modes. By way of example, the processor may receive a request for sensor data that identifies a first sensor and a second sensor. The request may also identify a first acquisition mode for the first sensor and a second acquisition mode for the second sensor. In response to receiving the request, the processor may then cause operation of the first sensor and second sensor in the respective acquisition modes.

In one example aspect, a method performed by a device having an application processor and a co-processor is provided. The application processor is configured to function based on an operation system and the co-processor is configured to receive data from a plurality of sensors of the device. The method involves receiving, by the co-processor and from the application processor, a request for sensor data. The request identifies at least two sensors of the plurality of sensors for which data is requested. The at least two sensors are configured to acquire data using a plurality of acquisition modes. The request further identifies for the at least two sensors respective acquisition modes for acquiring data that are selected from among the plurality of acquisition modes. The method also involves, in response to receiving the request, causing by the co-processor, the at least two sensors to acquire data in the respective acquisition modes. The method further involves receiving, by the co-processor, first sensor data from a first sensor of the at least two sensors and second sensor data from a second sensor of the at least two sensors. And the method involves providing, by the co-processor, the first sensor data and the second sensor data to the application processor.

In another example aspect, a computer readable memory configured to store instructions that, when executed by a device, cause the device to perform functions is provided. The device has an application processor configured to function based on an operation system and a co-processor configured to receive data from a plurality of sensors of the device. The functions include receiving a request for sensor data. The request identifies at least two sensors of the plurality of sensors for which data is requested. The at least two sensors are configured to acquire data using a plurality of acquisition modes. The request further identifies for the at least two sensors respective acquisition modes for acquiring data that are selected from among the plurality of acquisition modes. The functions also include, in response to receiving the request, causing, by the co-processor, the at least two sensors to acquire data in the respective acquisition modes. And the functions include receiving, by the application processor, first sensor data acquired using a first sensor of the at least two sensors and second sensor data acquired using a second sensor of the at least two sensors.

In still another example aspect, a device including an application processor, at least two sensors, and a co-processor is provided. The application processor is configured to function based on an operating system. The at least two sensors are configured to acquire data using a plurality of acquisition modes. The co-processor is configured to receive data from the at least two sensors. The co-processor is also configured to perform functions including receiving, from the application processor, a request for sensor data. The request identifies for the at least two sensors respective acquisition modes for acquiring sensor data that are selected from the plurality of acquisition modes. The functions also include, in response to receiving the request, causing the at least two sensors to acquire data in the respective acquisition modes. The functions further include receiving first sensor data from a first sensor of the at least two sensors and second sensor data from a second sensor of the at least two sensors. And the functions include providing the first sensor data and the second sensor data to the application processor.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 3A-3B are conceptual illustrations of an example computing device.

FIG. 9 is a conceptual illustration of an example digital image format.

FIG. 10 is a conceptual illustration of example sensor data formats.

FIG. 11 is schematic illustrating a conceptual partial view of an example computer program product that includes a computer program for executing a computer process on a computing device.

DETAILED DESCRIPTION

Figure 1:
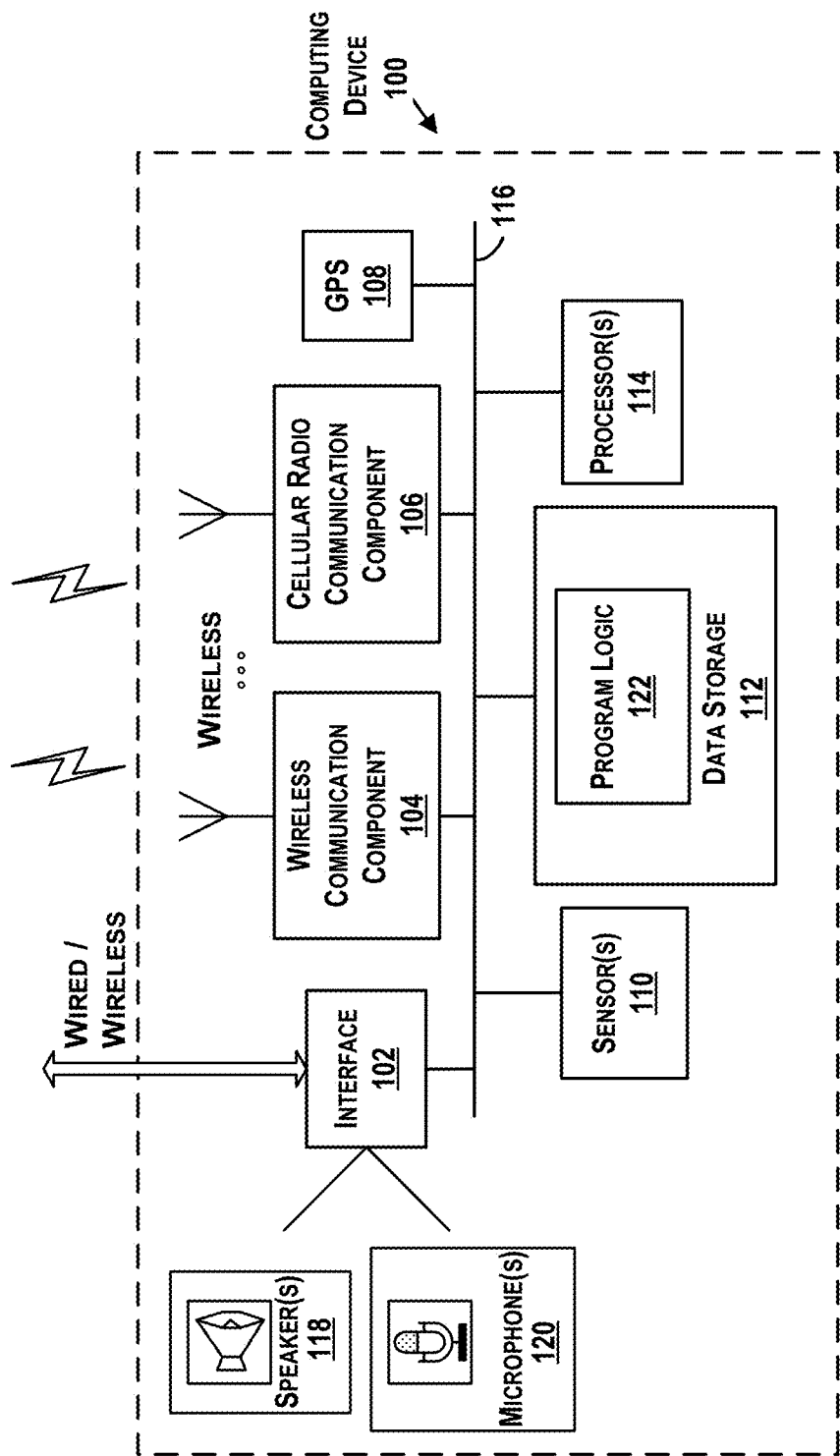
FIG. 1 illustrates an example computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Described herein are methods and systems for controlling operation of a plurality of sensors of a device. Within examples, the plurality of sensors may be configured to acquire data using a plurality of acquisition modes. For instance, the plurality of acquisition modes may include a triggered mode in which sensor data is captured at one or more predetermined times that are synchronized with a time clock of a processor of the device. The plurality of acquisition modes may also include a free-running mode in which sensor data is captured independently of a time clock of the co-processor at a predetermined frequency. Depending on a desired configuration and operation of the device, a processor may cause the sensors to acquire data in particular acquisition modes. For example, the processor may cause a first sensor to acquire data in a triggered mode and a second sensor to acquire data in a free-running mode.

Furthermore, the hardware configuration of the device may enable the processor to switch acquisition modes for one or more of the sensors. For instance, if a first application is executing on the device, the first sensor may be configured to operate in a first acquisition mode, while if a second application is executing on the device, the first sensor may be configured to operate in a second acquisition mode. In other examples, a particular application may cause one or more sensors to switch acquisition modes depending on the current state of the application. Thus, the device may be configured to adapt based on necessities for a specific application or algorithm.

According to an example method, a processor of a device may receive a request for sensor data from an application processor of the device. The request may identify at least two sensors of a plurality of sensors for which data is requested. For example, the request may identify a camera of the device and an inertial measurement unit (IMU) of the device. The request may also identify respective acquisition modes for the at least two sensors. As an example, the request may indicate a triggered mode for the camera and a free-running mode for the IMU.

In response to receiving the request, the processor may cause the camera and the IMU to acquire data in the respective acquisition modes. For instance, the processor may trigger the camera to capture image data at predetermined times, and the processor may instruct the IMU to acquire sensor data at a predetermined frequency. Additionally, the processor may receive image data from the camera and receive IMU data from the IMU. The processor may then provide the image data and the IMU data to the application processor of the device.

In some instances, the processor may also determine timestamps associated with the image data and IMU data. Based on the determined timestamps, the processor may then associate at least a portion of the image data and at least a portion of the IMU data together within a single data structure. For example, the processor may associate one or more intervals of IMU data with one or more images received from the camera based on an alignment of the IMU data and camera data in time.

Alternatively, rather than associating the image data and IMU data together within a single data structure, the camera and the IMU may be configured to provide the image data and the IMU data to the application processor. Further, the processor may be configured to provide the determined timestamps to the application processor. The application processor may then associate the image data and the IMU data based on the timestamps received from the processor.

As described below, various combinations of sensors and acquisition modes are contemplated. Additional example methods as well as example devices (e.g., mobile or otherwise) are described hereinafter with reference to the accompanying figures.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global positioning system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
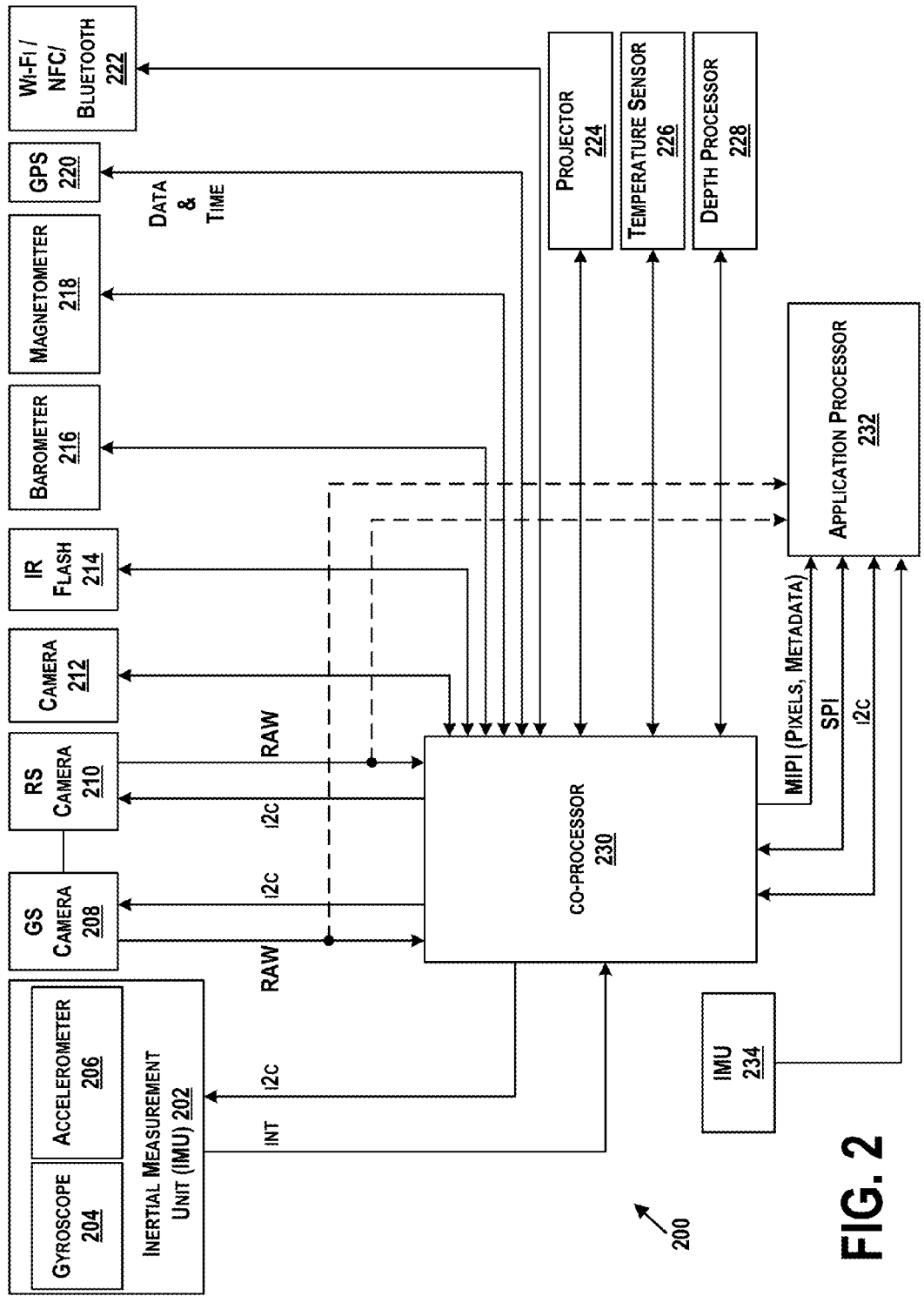
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a Wi-Fi/NFC/Bluetooth sensor 222, a projector 224, and a temperature sensor 226, each of which outputs to a co-processor 230. Additionally, the computing device 200 is shown to include a depth processor 228 that receives input from and outputs to the co-processor 230. The co-processor 230 receives input from and outputs to an application processor 232. And the computing device 200 is shown to further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

FIGS. 3A-3B are conceptual illustrations of a computing device 300 that show a configuration of some of the sensors on the computing device 300. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The Wi-Fi/NFC/Bluetooth sensor 222 may include wireless communication components configured to operate according to Wi-Fi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the RS camera 210 may be an RGB-IR camera that is configured to capture one or more images of the dot pattern and provide image data to the depth processor 228. The depth processor 228 may then be configured to determine distances to and shapes of objects based on the projected dot pattern. By way of example, the depth processor 228 may be configured to cause the projector 224 to produce a dot pattern and cause the RS camera 210 to capture an image of the dot pattern. The depth processor may then process the image of the dot pattern, use various algorithms to triangulate and extract 3D data, and output a depth image to the co-processor 230.

The temperature sensor 226 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232. The co-processor 230 may also be configured to perform other functions, as described below.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210. The application processor 232 may also be configured to perform other functions, as described below.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
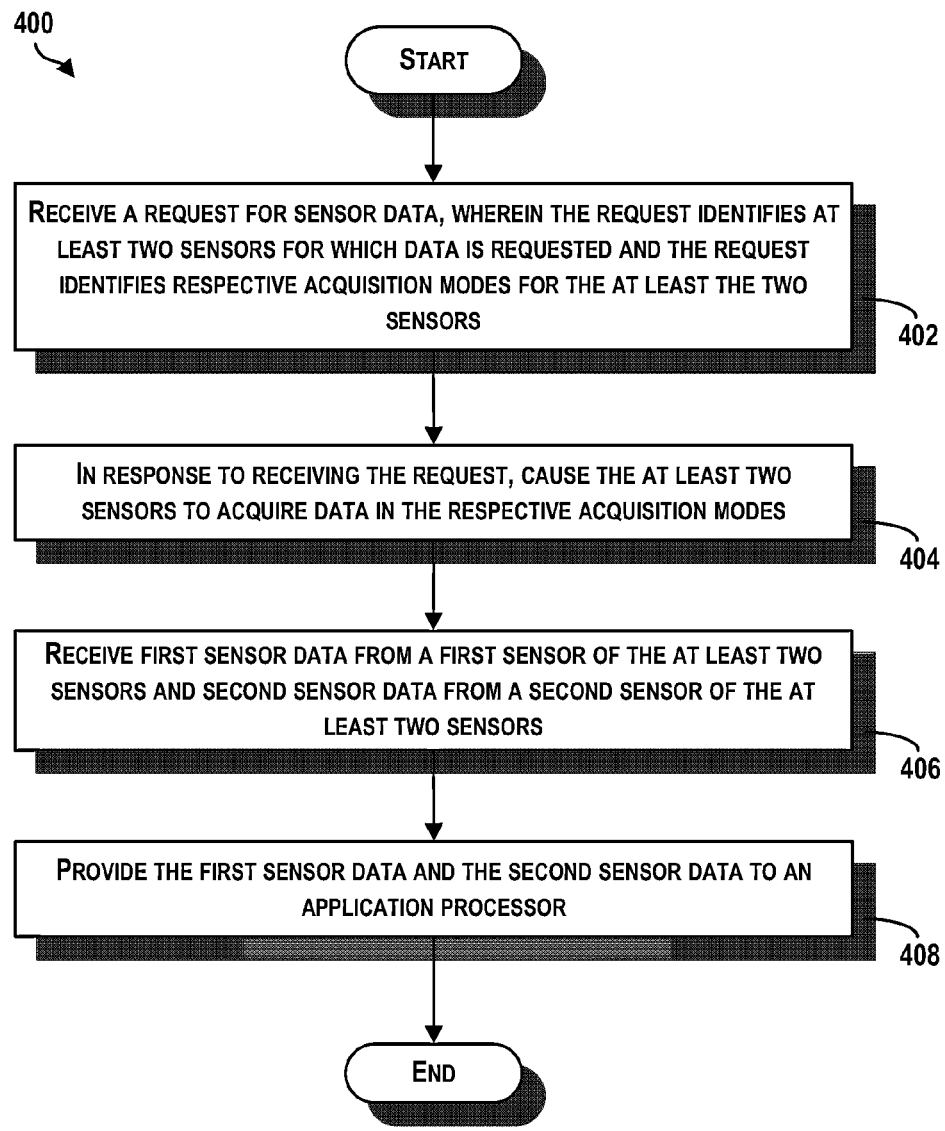
FIG. 4 is a block diagram of an example method for acquiring sensor data.

FIG. 4 is a block diagram of an example method 400 for acquiring sensor data. Method 400 shown in FIG. 4 presents an embodiment of a method that could be used or implemented by the computing device 100 of FIG. 1 or the computing device 200 of FIG. 2, for example, or more generally by one or more components of any computing device. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or servers. As one example, the method 400 may be performed by a device that has an application processor configured to function based on an operating system and a co-processor configured to receive data from a plurality of sensors of the device. The sensors may include any sensors as described above in any of FIG. 1, FIG. 2, or FIGS. 3A-3B, for example, including an IMU, a global shutter camera, a rolling shutter camera, a structured light projector, a depth camera, an infrared flash, a barometer, a magnetometer, and a temperature sensor. It is contemplated that the sensors may include other types of sensors as well.

Functions of the method 400 are described by way of example as being performed by the co-processor 230 of FIG. 2. In other embodiments, one or more functions of the method 400 may be performed by one or more other components of a device, such as the application processor 232 of FIG. 2. Thus, the example method 400 is not meant to be limiting.

Initially, at block 402, the method 400 includes receiving a request for sensor data. The request may identify at least two sensors of the device for which data is requested. For example, the request may identify two or three cameras of the mobile. As another example, the request may identify a camera and one or any combination of an IMU, an accelerometer, a gyroscope, a barometer, a magnetometer, and a temperature sensor. As yet another example, the request may identify a projector and an IR camera, which may be used to generate depth data, as well as an IMU. Or the request may identify a projector and an IR camera as well as another camera. Thus, the request may identify any combination of two or more sensors of the device.

The sensors identified in the request may be may be configured to acquire sensor data using a plurality of acquisition modes. In one example, each of the two sensors may be configured to acquire sensor data in a plurality of acquisition modes. One acquisition mode may be a free-running mode in which sensor data is captured independently of a time clock of the co-processor at a predetermined frequency. In the free-running mode, the co-processor of the device may be configured to determine timestamps associated with intervals of sensor data received from the sensor. For example, the co-processor may determine a timestamp indicating when each interval was acquired or received by the co-processor.

Another example acquisition mode is a triggered mode. In the triggered mode, sensor data may be captured at one or more predetermined times that are synchronized with the time clock of the co-processor. For instance, the co-processor may trigger the sensor to capture sensor data at specific intervals aligning with the time clock of the co-processor. Or the co-processor may instruct a sensor to capture sensor data whenever another sensor captures sensor data, such that sensor is triggered by the other sensor. The other sensor may in turn be acquiring sensor data in either a free-running mode or a triggered-mode. Other acquisition modes are also possible.

Furthermore, the request may identify, for the at least two sensors, respective acquisition modes for acquiring data. For example, the respective acquisition modes may be selected from among the plurality of acquisition modes in which each sensor is configured to acquire data. In one instance, the identified acquisition mode for the first sensor may be a free-running mode and the identified acquisition mode for the second sensor may be a triggered mode. In another instance, the identified acquisition mode for the first sensor and the second sensor may be the same acquisition mode. In still another instance, the request may identify three sensors, and the identified acquisition mode for two of the sensors may be the same, but the identified acquisition mode for the third sensor may be different from the acquisition mode of the first two sensors.

There are a number of factors that may influence a decision regarding which acquisition modes to use for the sensors, such as latency, memory usage, power consumption, and the availability of a sensor's unique features. For example, if an algorithm executing on the device is time sensitive, such that latency negatively affects accuracy or performance, the algorithm may rely on sensor data that is determined using a triggered mode. If sensors acquire data in a free-running mode, the co-processor may have to wait for data from difference sensors to be output by the sensors before the co-processor can generate a digital image and provide the sensor data to the application processor. This could introduce latency into the process.

As another example, if an algorithm relies on special features of a sensor that the sensor may not be able to provide when the sensor is manually triggered, the algorithm may instead select a free-running mode. For instance, when manually triggering a camera, it may be necessary to bypass the auto-exposure or gain features of the camera. If the algorithm requests to utilize the auto-exposure features, the request may include a free-running mode for the camera.

As still another example, an algorithm may select a first acquisition mode rather than a second acquisition mode if the first acquisition mode consumes less power than the second acquisition mode. For instance, when an algorithm detects that a device is not moving very much (e.g., because the position of the device has not changed by more than a threshold amount during a predetermined amount of time, such as one-half meter within the past two seconds, two meters within the past four seconds, etc.), the algorithm may request a triggered mode for one or more sensors. By way of example, the sensors may include a projector and an IR camera that are used to acquire depth data, and because the device is not moving very much, the algorithm may request that the projector and the IR camera be triggered at a reduced frequency rate, such as once per second or once every three seconds.

At block 404, the method 400 includes, in response to receiving the request, causing the at least two sensors to acquire data in the respective acquisition modes. For example, the co-processor may instruct a first sensor identified in the request to acquire sensor data in a first acquisition mode, and the co-processor may instruct a second sensor identified in the request to acquire sensor data in a second acquisition mode.

In some instances, the co-processor may instruct a sensor to acquire sensor data for a predetermined length of time (e.g., 1 second, 5 seconds, a minute, etc.). In other instances, the co-processor may instruct a sensor to acquire a predetermined number of intervals of sensor data (e.g., 10 intervals of IMU data, 10 images, 25 intervals of sensor data, etc.). In still other instances, the co-processor may instruct a sensor to acquire sensor data in an acquisition mode until receiving subsequent instructions from the co-processor.

As one example, the co-processor may instruct a camera to capture images in a triggered mode. In practice, the co-processor may instruct the camera to capture images at 30 Hz in a manner that is synchronized with a time clock of the co-processor. In other words, the co-processor may trigger the camera to capture images about once every 33 milliseconds, and at each interval, the co-processor may trigger the camera to capture an image.

As another example, the co-processor may instruct a camera to capture images in a free-running mode. For instance, the co-processor may instruct the camera to capture images at 60 Hz, independently of a time clock of the co-processor. That is, the camera may use its own time clock to determine when it is time to capture another image. Further, the co-processor may then configure a second camera to capture an image whenever the free-running camera captures an image. For instance, whenever the co-processor receives an interrupt indicating that the free-running camera is capturing an image, the co-processor may responsively trigger the second camera to capture an image.

At block 406, the method 400 includes receiving first sensor data from a first sensor of the at least two sensors and second sensor data from a second sensor of the at least two sensors. In some examples, the first sensor data may include multiple intervals of data and/or the second sensor data may include multiple intervals of data. For instance, the co-processor may receive multiple intervals of IMU data or receive multiple images from a camera. Optionally, the co-processor may store the first sensor data and second sensor data in a data buffer.

And at block 408, the method 400 includes providing the first sensor data and the second sensor data to an application processor. In one example, the co-processor may provide the first sensor data and the second sensor data to the application processor individually. For instance, the co-processor may provide the first sensor data to the application processor in a first data structure, and provide the second sensor data to the application processor in a second data structure.

In another example, the co-processor may provide the first sensor data and the second sensor data to the application processor within a single data structure. As one example, the co-processor may generate a digital image that includes the first sensor data and the second sensor data. For example, a file may be generated in a digital image format that includes both the first sensor data and the second sensor data. If either of the first sensor data or second sensor data is image data, the image data may already be in pixel format, therefore the image data may be included in the digital image in a straightforward manner. Optionally, the image data may be converted from a first image format to a second image format in which the digital image is generated.

If the first sensor data or the second sensor data is not image data, the first sensor data or the second sensor data may be included within the digital image by embedding the sensor data in multiple pixels of the digital image. For instance, the co-processor may be configured to represent the sensor data as fake pixels in the digital image (i.e., pixels whose values have been defined by a processor to represent a portion of a sensor value).

By way of example, the digital image may include pixels that are defined in a brightness and chrominance (YUV) color space. A 16-bit raw sensor value can then be embedded in a "Y" space of two pixels. For instance, eight bits of the 16-bit raw sensor value can be represented in a "Y" space of a first pixel and the remaining eight bits can be embedded in a "Y" space of a second pixel. Values in the "U" space and the "V" space of the pixels can be set to zero in order to ensure that the sensor value is not skewed during image compression or packing, for example.

As another example, a 32-bit single-precision floating point number can be represented in the "Y" space of four separate 8-bit pixels, while values in the "U" space and the "Y" space can be set to zero. Other examples are also possible depending on the number of bytes per pixel and/or color space utilized by the digital image. For instance, the sensor data may be embedded in the "U" space or "V" space instead of the "Y" space.

The co-processor may then provide the digital image to the application processor of the mobile device. For instance, the co-processor may provide the digital image to the application processor using a camera bus interface, such as a MIPI. As further described below, in some examples, the digital image may be generated in intervals (e.g., at a frequency of 30 Hz), such that new digital images with new sensor data are repeatedly provided to the application processor in sequence.

In some examples, the method 400 may also involve determining timestamps associated with the first sensor data and the second sensor data. For instance, the co-processor may determine timestamps that indicate when sensor data was acquired or received by the co-processor. As an example, the co-processor may receive multiple intervals of accelerometer data, and the co-processor may determine a timestamp indicating when each interval of the accelerometer data was acquired. As another example, the co-processor may determine timestamps indicating when individual images are received by the co-processor from a camera.

In some instances, the co-processor may provide the determined timestamps to the application processor. For example, the co-processor may embed the determined timestamps within pixels of a digital image, or the co-processor may send the determined timestamps to the application processor. As a specific example, the co-processor may be configured to receive first sensor data and second sensor data from a first sensor and a second sensor respectively. The first sensor data and the second sensor data may both include multiple intervals of data. The co-processor may determine timestamps associated with the intervals of the first sensor data and the intervals of the second sensor data. Based on the determined timestamps, the co-processor may associate one or more intervals of the first sensor data and one or more intervals of the second sensor data together within a digital image, and provide the digital image to the application processor. The determined timestamps may be embedded within the digital image as well.

Furthermore, the co-processor may determine timestamps associated with third sensor data acquired using a third sensor. However, rather than including the third sensor data and the third timestamps within the digital image, the third sensor data and associated timestamps may be provided to the application processor. For instance, the third sensor may output data directly to the application processor, or the third sensor may output data to the co-processor and the co-processor may output the third sensor data to the application processor without embedding the third sensor data within the digital image. Regardless of whether or not the co-processor receives the third sensor data, the co-processor may determine the timestamps associated with the third sensor data based on interrupts received from the third sensor.

In a further example of the method 400, the request received from the application processor may identify a GPS time. For instance, the request may identify a current GPS time that is determined using a GPS receiver of the device. The co-processor may then adjust a time clock of the co-processor based on the GPS time. For instance, the co-processor may adjust the time clock of the co-processor to match the GPS time, such that data collected across multiple devices can be synchronized using an absolute time scale.

Figure 5:
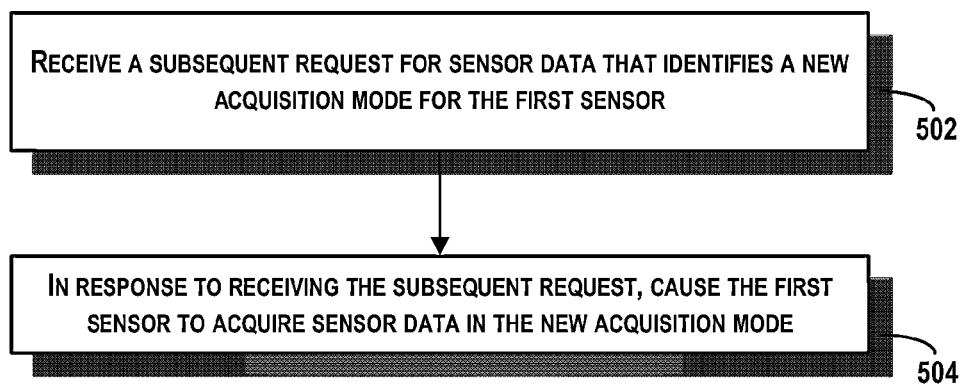
FIG. 5 is a block diagram of additional or optional functions that may be performed in conjunction with the example method of FIG. 4.

In line with the discussion above, the co-processor may also be configured to cause one or more sensors of the device to switch acquisition modes. By way of example, FIG. 5 is a block diagram of additional or optional functions that may be performed in conjunction with the example method of FIG. 4.

At block 502, the method 400 includes receiving a subsequent request for sensor data that identifies a new acquisition mode for the first sensor. And at block 504, the method 400 includes, in response to receiving the subsequent request, causing the first sensor to acquire sensor data in the new acquisition mode.

In one example, the device may be executing an application that is configured to track a position and orientation of the device using wide-angle images received from a camera having a wide-angle lens and IMU data received from an IMU. Furthermore, the application may be configured to occasionally use a higher resolution image to capture the imagery of an environment. Accordingly, the application processor may provide a request to the co-processor that identifies the first, wide-angle lens, camera, the IMU, and the second, higher-resolution, camera. In this scenario, the request may identify a triggered mode for the second camera. In other words, the co-processor may manually trigger the second camera to capture high-resolution images as needed.

On the other hand, if the device is being used to perform an augmented reality game, an application executing on the device to provide the game may repeatedly require high-resolution images captured at high frame rate. Accordingly, the application processor may provide a subsequent request to the co-processor that identifies a new acquisition mode for the second camera. In particular, the new acquisition mode may be a free-running mode. In response to receiving the subsequent request, the co-processor may then cause the second camera to acquire high-resolution images in the free-running mode.

More generally, the co-processor may receive a subsequent request that identifies a new acquisition mode for one or more sensors whenever a new algorithm executing on the device requires a different acquisition mode. For instance, the application processor may provide a first request when a first algorithm is executing on the device. Subsequently, if a second algorithm that is executing on the device requires a different acquisition mode for one or more of the sensors, the application processor may provide a subsequent request to change the acquisition mode(s).

Figure 6:
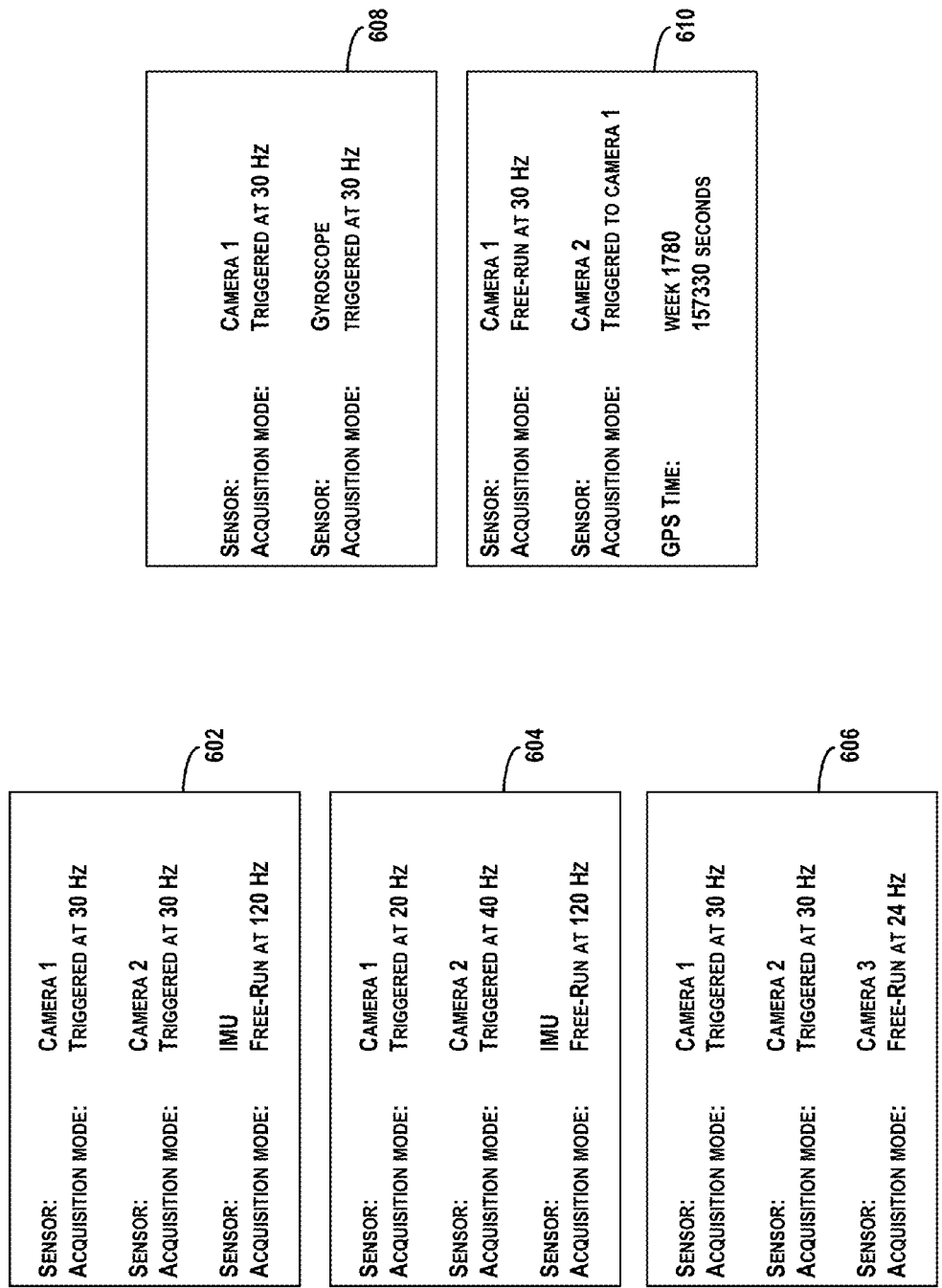
FIG. 6 is a conceptual illustration of example requests for sensor data.

FIG. 6 is a conceptual illustration of example requests 602-610 for sensor data. As shown in FIG. 6, a first example request 602 identifies three sensors: camera 1, camera 2, and IMU. Furthermore, the first request 602 identifies that camera 1 and camera 2 are triggered at 30 Hz and IMU is free-run at 120 Hz. The first request 602 may produce images from camera 1 and camera 2 that align in time, and intervals of IMU data that are determined independently of when the images from camera 1 and camera 2 are acquired.

A second example request 604 is similar to the first request 602, except that the camera 2 outputs images at twice the frequency of camera 1. Therefore, each image output by camera 1 may correspond with every other image output by camera 2. And again the IMU data may be determined independently of when the images from camera 1 and camera 2 are acquired.

As further shown in FIG. 6, a third example request 606 identifies three sensors: camera 1, camera 2, and camera 3. Camera 1 and camera 2 may be triggered at the same frequency (i.e., 30 Hz), but camera 3 may be free-run at a frequency that does not easily synchronize with camera 1 and camera 2. In some examples, allowing camera 3 to free-run may enable the device to take advantage of features offered by camera 3 that are eliminated when the camera is manually triggered. For instance, when manually triggering camera 3, it may be necessary to bypass the auto-exposure or gain features of the camera. Thus, because camera 3 is requested to free-run, images may still be captured using the auto-exposure or gain features of the camera.

A fourth example request 608 identifies two sensors: camera 1 and a gyroscope. Because the fourth request 608 identifies that camera 1 and the gyroscope are both triggered, the fourth request 608 may produce images that include a snapshot of gyroscope data corresponding to the same timeframe. For example, in response to receiving the fourth request 608, a co-processor may trigger an image and a snapshot of gyroscope data to be captured at the same time.

A fifth example request 610 identifies two sensors: camera 1 and camera 2. The fifth request 610 further indicates that camera 1 is to be free-run at 30 Hz and camera 2 is to be triggered to camera 1. As discussed above, by allowing camera 1 to free-run, the device may take advantage of all of the features of camera 1. Advantageously, camera 2 can still be synchronized with camera 1 in time by triggering camera 2 to capture an image whenever camera 1 captures an image.

The fifth request 610 also includes a GPS time, expressed as a week number and a number of seconds into the week. In response to receive the GPS time, a co-processor may configure a time clock of the co-processor to match the GPS time. The GPS time may thus be an absolute time scale which data collected which can be used to synchronize data collected from different devices.

Other example requests are also possible.

Figure 7A:
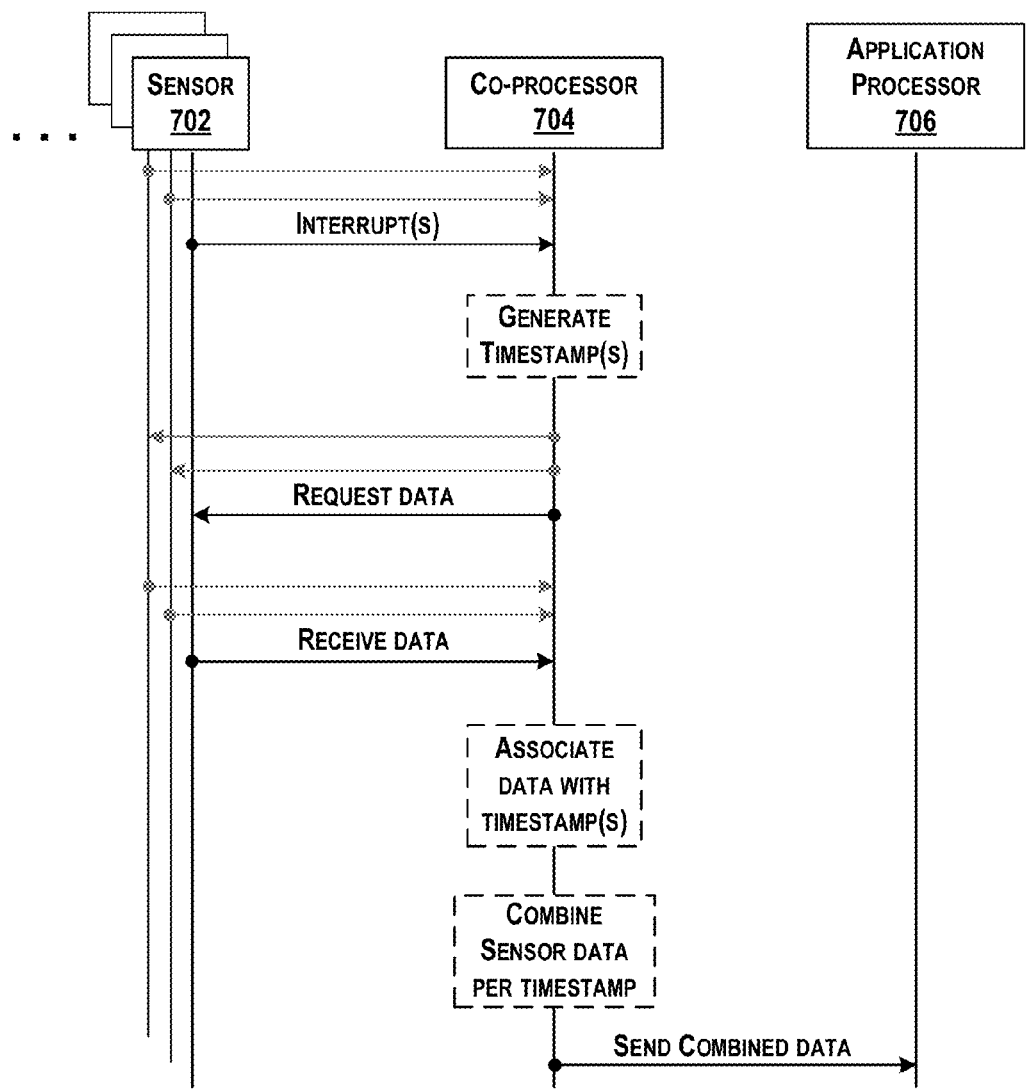
FIG. 7A is an example timing diagram conceptually illustrating synchronizing data received from multiple sensors of a device.
Figure 7B:
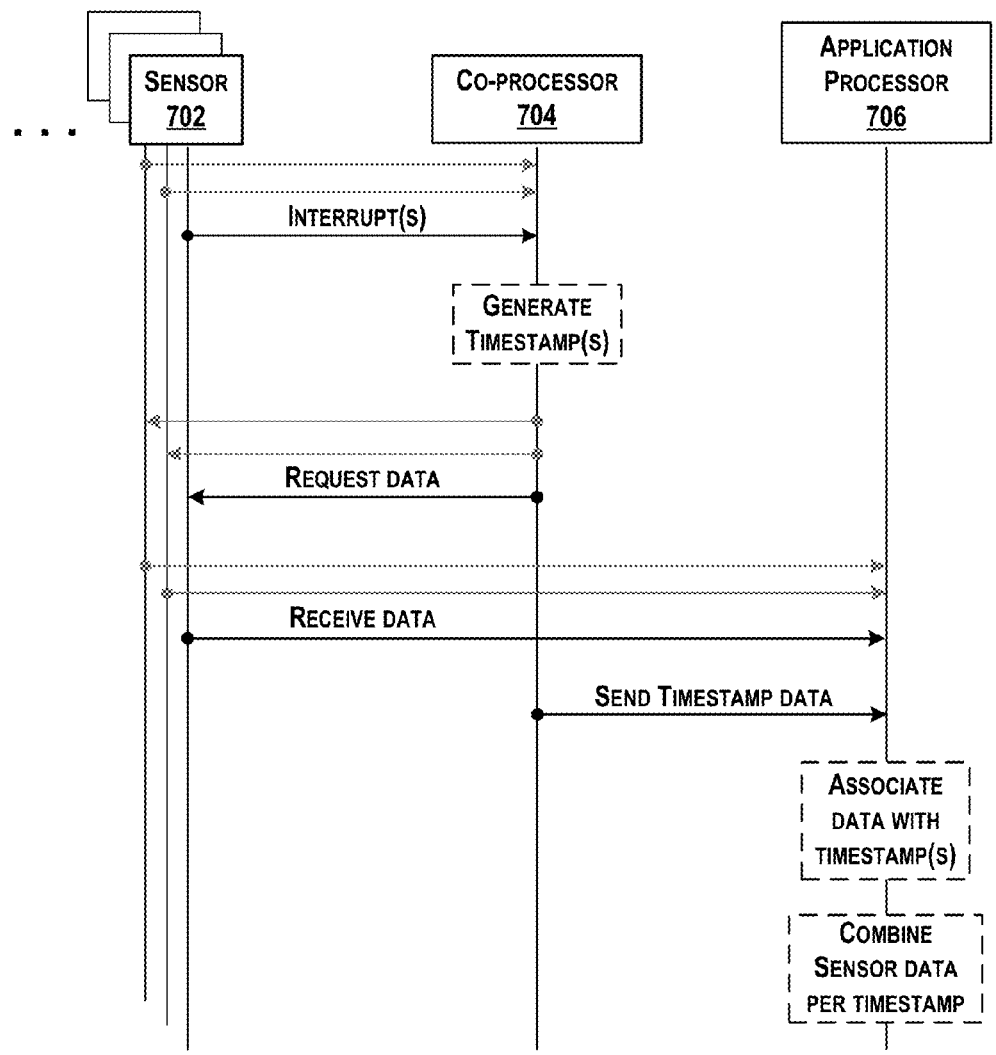
FIG. 7B is another example timing diagram conceptually illustrating synchronizing data received from multiple sensors of a device.

Turning now to FIGS. 7A and 7B, additional details regarding example techniques for determining timing information are described. FIG. 7A is an example timing diagram conceptually illustrating synchronizing data received from multiple sensors of a device. As shown, a sensor 702 may provide an interrupt to a co-processor 704, at which time the co-processor 704 will generate a timestamp. A number of sensors may provide interrupts to the co-processor 704 simultaneously or at various intervals, and upon receipt of an interrupt, the co-processor 704 will generate an associated timestamp. The co-processor 704 may then request the data from the sensor 702 corresponding to the interrupt, and subsequently receive the data from the sensor 702. In other examples, the co-processor 704 may not need to request the data from the sensor 702 as the sensor 702 will provide the data after providing an interrupt. Upon receipt of the sensor data, the co-processor may associate the timestamp with the respective data by matching interrupt timestamps to corresponding sensor data, and then combine sensor data per timestamp into a single data structure per timestamp. The co-processor 704 may subsequently provide the data structures to an application processor 706 in sequence.

FIG. 7B is another example timing diagram conceptually illustrating synchronizing data received from multiple sensors of a device. In FIG. 7B, the sensor 702 may provide an interrupt to the co-processor 704, at which time the co-processor 704 will generate a timestamp. A number of sensors may provide interrupts to the co-processor 704 simultaneously or at various intervals, and upon receipt of an interrupt, the co-processor 704 will generate an associated timestamp. The co-processor 704 may then request the data from the sensor 702 corresponding to the interrupt, and subsequently the sensor 702 may forward the data to the application processor 706. The co-processor 704 may then send the timestamp data to the application processor 706. Upon receipt of the data, the application processor 706 may associate the timestamp with the respective data by matching interrupt timestamps to corresponding sensor data, and then combine sensor data per timestamp into a single data structure per timestamp.

Figure 8:
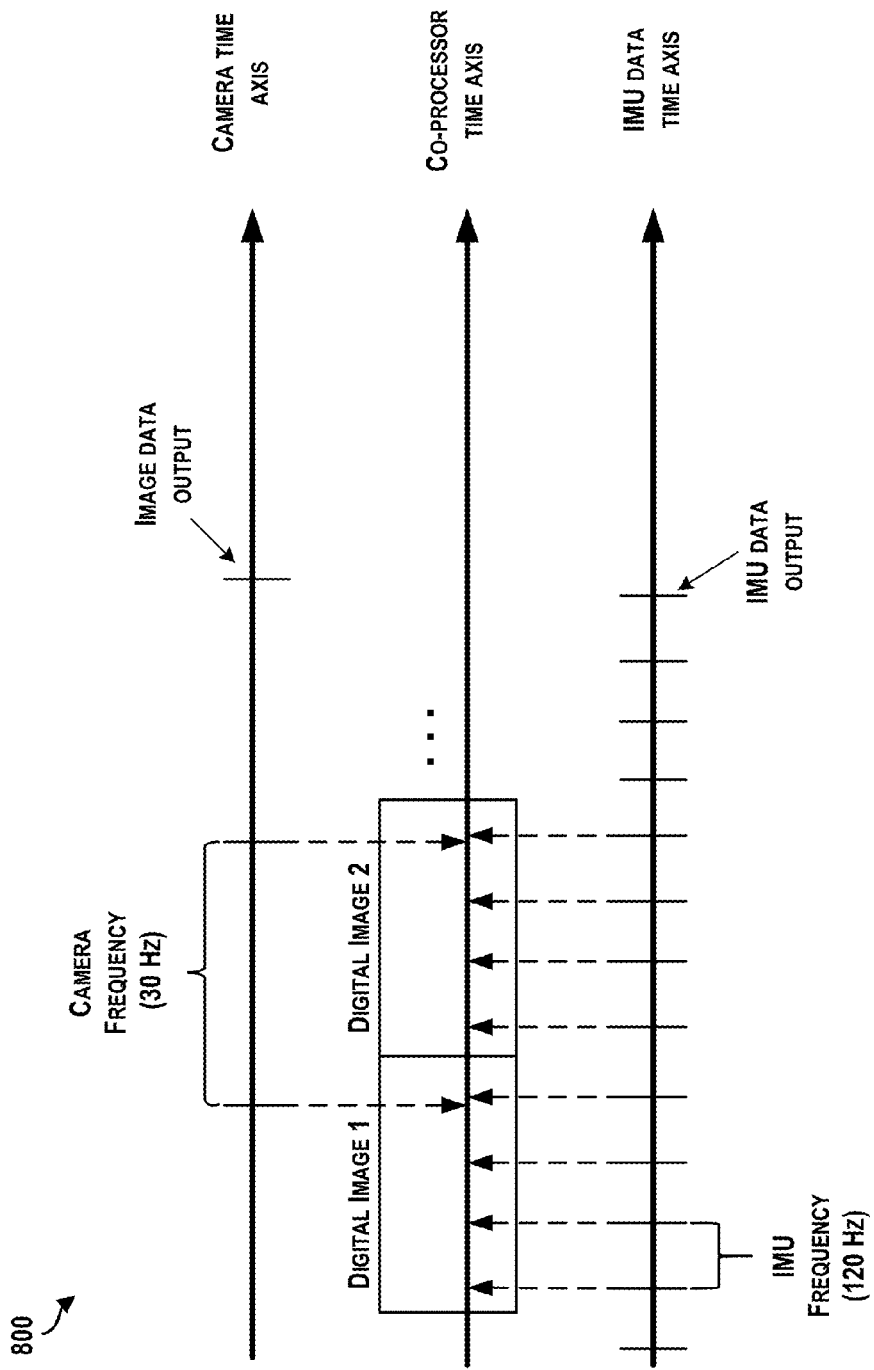
FIG. 8 is an example diagram conceptually illustrating generating a digital image.

FIG. 8 is an example diagram 800 conceptually illustrating generating a digital image. As shown in the diagram 800, a first sensor (i.e. a camera of the mobile device) may output image data at a first frequency of 30 Hz, and a second sensor (i.e. an IMU) may output data at a second frequency of 120 Hz. Furthermore, a co-processor may generate digital images at a third frequency. In the example diagram 800, the third frequency is the same frequency as the first frequency of the camera, 30 Hz. In other examples, the third frequency may be a multiple of the first frequency, or the first frequency may be a multiple of the third frequency.

The co-processor may be configured to generate a first digital image during a first timeframe. As depicted in the example diagram 800, the first digital image includes a single output of image data (e.g., a single image), and multiple outputs of sensor data provided by the IMU. Similarly, the second digital image includes second image data output by the camera during a second subsequent timeframe and multiple additional outputs of sensor data received during the second timeframe.

The sensor data output by the IMU may thus be time-aligned with the image data output by the camera. The table below shows a sample set of images and sensor data that may be packed into a digital image together according to an example embodiment. For instance, the table illustrates sample image data received at 30 Hz (approximated as once every 33 ms in the table and IMU packets received at 120 Hz (approximated as once every 8 ms in the table).

| Digital Image 1<br>Begin: ts 0 ms | Digital Image 2<br>Begin: ts 33 ms | Digital Image 3<br>Begin: ts 66 ms |
|---|---|---|
| IMU pkt 1: ts 3 ms<br>IMU pkt 2: ts 11 ms<br>IMU pkt 3: ts 19 ms<br>IMU pkt 4: ts 27 ms<br>Image 1: ts 30 ms | IMU pkt 5: ts 35 ms<br>IMU pkt 6: ts 43 ms<br>IMU pkt 7: ts 51 ms<br>IMU pkt 8: ts 59 ms<br>Image 2: ts 63 ms | IMU pkt 9: ts 67 ms<br>IMU pkt 10: ts 75 ms<br>IMU pkt 11: ts 83 ms<br>IMU pkt 12: ts 91 ms<br>Image 3: ts 96 ms |

In some embodiments, the first digital image and the second digital image may include additional types of data as well. FIG. 9 is a conceptual illustration of an example digital image format. The conceptual illustration 900 is shown for purposes of example only, and is not meant to be limiting in any manner. Other configurations and formats for the digital image are also contemplated.

As shown in FIG. 9, the example digital image format includes sensor data 902, computer-vision data 904, first camera data 906, depth data 908, and second camera data 910. The sensor data 902 is shown within the first sixteen rows of a digital image. Thereafter, in the next few rows, the computer-vision data 904 determined by the co-processor is provided.

The computer-vision data may identify locations and/or descriptions of image features determined using a two-dimensional image and/or image features determined using depth data. Example types of image features include edges, corners/interest points, and blobs. An edge is a point in an image where there is a boundary between two image regions. Corners, or more generally interest points, refer to point-like features in an image which have a local two-dimensional structure. Algorithms such as the Harris & Stephens algorithm can be used to detect edges and corners. The Features from Accelerated Segment Test (FAST) algorithm is another example of an algorithm that may be used to detect corners and interest points. Finally, blobs describe regions of interest in an image (e.g., regions that are too smooth to be detected by a corner detector). The FAST algorithm, among others, can also be used to detect blobs.

In an example in which the digital image is provided to the application processor row by row, the sensor data 902 would first be provided, followed by the computer-vision data 904. Below the sensor data 902 and computer-vision data 904, which are shown as occupying 31 rows in the example digital image format 900, larger data sources are provided. The larger data sources include the first camera data 906, followed by the depth data 908, and the second camera data 910. In one example, the first camera data 906 may be an image from a first camera having a field of view that is greater than 120 degrees, such as the GS camera 208 of FIG. 2. Further, the second camera data may be an image from a second camera having a smaller field of view, such as the RS camera 210 of FIG. 2.

Note that the example digital image format shown in FIG. 9 is just one example. In other instances, other digital image formats may be utilized. For instance, the first camera data 906 and the second camera data 910 may be located side-by-side within rows 31-510 of a digital image (not shown). Similarly, in other example digital image formats, more or less data may be provided. For instance, in another digital image format the depth data or the computer-vision data may be omitted, or third camera data from a third camera may also be included. As another example, in another digital image format, a combined color and depth image may be provided in addition to or in place of the first camera data 906, the depth data 908, and/or second camera data 910.

In another example digital image format, the digital image may include padding between one or more of the different data segments. For example, the digital image may be padded with blank or empty data in between the first camera data 906 and the depth data 908 or between the depth data 908 and the second camera data 910. In some instances, the padding between the different data segments may be inserted in order to make sure that the beginning of each data segment corresponds to the beginning of a sector or subdivision of a track in a memory.

As an example, padding may be inserted between data segments to make sure that the beginning of the first camera data 906 corresponds to the beginning of a 4096-byte (4K) sector. This may allow the first camera data 906 to be written more efficiently to memory. Similarly, the digital image may be padded such that the beginning of each of the depth data 908 and second camera data 910 corresponds to the beginning of a 4K sector.

In another example digital image format, the width of the digital image may be 1280 pixels. As a result, each row of the digital may include two rows of pixel data from the first camera data. The rows may be organized side-by-side. For example, columns 0-639 of row 31 of the digital image may include a first row of pixels of the first camera data 906 and columns 640-1279 or row 31 may include a second row of pixels of the first camera data 906. Similarly, a single row of the digital image may include 4 rows of depth data 908 or two rows of pixels of second camera data 910.

In some instances, frame numbers may also be include at the beginning and end of the digital frame and/or at the beginning or end of each data segment (not shown). The frame numbers may enable an application processor to confirm that data of a received digital image all corresponds to the same digital image, rather than a previously received digital image, for example.

In FIG. 10, a conceptual illustration 1000 of example sensor data formats is provided. As shown in FIG. 10, accelerometer data is provided in a first line (e.g., a first row of pixels) of a digital image. In particular, the eight highest bits of a 16-bit x-axis acceleration value (i.e., a high byte) are shown within the "Y" space of a first pixel while the eight lowest bits of the 16-bit x-axis acceleration value (i.e., a low byte) are shown within the "Y" space of a second pixel. Similarly, y-axis acceleration values and z-axis acceleration values are shown in the "Y" space of pixels 2-3 and 4-5 respectively. Furthermore, gyroscope data and magnetometer data are also embedded within the "Y" space of pixels 0-5 of lines 1 and 2.

The barometer reading is shown as four separate bytes (B3, B2, B1, and B0) that, when combined, represent a 32-bit number. In line 4, an integer component of a temperature reading is shown in the "Y" space of pixels 0-1, while a fraction component of the temperature reading is shown in the "Y" space of pixels 2-3. Additionally, a timestamp that has been divided into four eight bit values is also shown in line 5. In other examples, the sensor data may also include timestamp data for one or more of the other sensors.

Although sensor data for each type of sensor is located within an individual row of pixels in FIG. 10, in other examples, the sensor data may be represented within a single row of pixels (not shown). For example, the gyroscope data may be embedded in the "Y" space of pixels 6-11, the magnetometer data may be represented in the "Y" space of pixels 12-17, and so forth.

FIG. 10 also illustrates example formats of computer-vision data. For example, a first four-byte image feature is embedded in the "Y" space of the first four pixels of line 16. Additionally, a second, two-byte, image feature is embedded in the "Y" space of pixels 4-6. Other configurations are also contemplated.

In some embodiments, the disclosed methods may be implemented as computer program instructions encoded on a non-transitory computer-readable storage media in a machine-readable format, or on other non-transitory media or articles of manufacture. FIG. 11 is a schematic illustrating a conceptual partial view of an example computer program product 1100 that includes a computer program for executing a computer process on a computing device, arranged according to at least some embodiments presented herein.

In one embodiment, the example computer program product 1100 is provided using a signal bearing medium 1101. The signal bearing medium 1101 may include one or more programming instructions 1102 that, when executed by one or more processors may provide functionality or portions of the functionality described above with respect to FIGS. 1-10. In some examples, the signal bearing medium 1101 may encompass a computer-readable medium 1103, such as, but not limited to, a hard disk drive, a Compact Disc (CD), a Digital Video Disk (DVD), a digital tape, memory, etc. In some implementations, the signal bearing medium 1101 may encompass a computer recordable medium 1104, such as, but not limited to, memory, read/write (R/W) CDs, R/W DVDs, etc. In some implementations, the signal bearing medium 1101 may encompass a communications medium 1106, such as, but not limited to, a digital and/or an analog communication medium (e.g., a fiber optic cable, a waveguide, a wired communications link, a wireless communication link, etc.). Thus, for example, the signal bearing medium 1101 may be conveyed by a wireless form of the communications medium 1106 (e.g., a wireless communications medium conforming to the IEEE 802.11 standard or other transmission protocol).

The one or more programming instructions 1102 may be, for example, computer executable and/or logic implemented instructions. In some examples, a computing device such as the computing device 100 of FIG. 1 may be configured to provide various operations, functions, or actions in response to the programming instructions 1102 conveyed to the computing device 100 by one or more of the computer-readable medium 1103, the computer recordable medium 1104, and/or the communications medium 1106.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a device having an application processor configured to function based on an operating system and a co-processor configured to receive data from a plurality of sensors of the device, the method comprising:
    receiving, by the co-processor and from the application processor, a request for sensor data, wherein:
        the request identifies at least two sensors of the plurality of sensors for which data is requested,
        the at least two sensors are configured to acquire data using a plurality of acquisition modes, and
        the request further identifies, for the at least two sensors, respective acquisition modes for acquiring data, the respective acquisition modes selected from among the plurality of acquisition modes;
    in response to receiving the request, causing, by the co-processor, the at least two sensors to acquire data in the respective acquisition modes;
    receiving, by the co-processor, first sensor data from a first sensor of the at least two sensors and second sensor data from a second sensor of the at least two sensors; and
    providing, by the co-processor, the first sensor data and the second sensor data to the application processor.

2. The method of claim 1, wherein the first sensor data and the second sensor data are provided to the application processor within a single data structure.

3. The method of claim 1, wherein the first sensor data and the second sensor data are provided to the application processor within a single image.

4. The method of claim 1, wherein the plurality of acquisition modes comprise a free-running mode in which sensor data is captured independently of a time clock of the co-processor at a predetermined frequency and a triggered mode in which sensor data is captured at one or more predetermined times that are synchronized with the time clock of the co-processor.

5. The method of claim 4, wherein the identified acquisition mode for the first sensor is the free-running mode and the identified acquisition mode for the second sensor is the triggered mode.

6. The method of claim 5, wherein the first sensor comprises a first camera and the second sensor comprises a second camera.

7. The method of claim 5, wherein the second sensor comprises a camera and the first sensor comprises a sensor selected from the group consisting of: an inertial measurement unit, an accelerometer, a gyroscope, a barometer, a magnetometer, and a temperature sensor.

8. The method of claim 1, further comprising causing the first sensor to switch acquisition modes in response to receiving a subsequent request for sensor data from the application processor, wherein the subsequent request identifies a new acquisition mode selected from among the plurality of acquisition modes.

9. The method of claim 1, wherein the first sensor data comprises multiple intervals of data and the second sensor data comprises multiple intervals of data, and the method further comprises:
    determining, by the co-processor, timestamps associated with the multiple intervals of the first sensor data and timestamps associated with the multiple intervals of the second sensor data; and
    associating, by the co-processor and together within a single data structure, at least one interval of the multiple intervals of the first sensor data and at least one interval of the multiple intervals of the second sensor data based on the determined timestamps.

10. The method of claim 9, wherein the request further identifies a global positioning system (GPS) time, and the method further comprises configuring, by the co-processor, a time clock of the co-processor based on the GPS time.

11. A non-transitory computer readable memory configured to store instructions that, when executed by a device having an application processor configured to function based on an operating system and a co-processor configured to receive data from a plurality of sensors of the device, cause the device to perform functions comprising:
    receiving a request for sensor data, wherein:
        the request identifies at least two sensors of the plurality of sensors for which data is requested,
        the at least two sensors are configured to acquire data using a plurality of acquisition modes, and
        the request further identifies, for the at least two sensors, respective acquisition modes for acquiring data, the respective acquisition modes selected from among the plurality of acquisition modes;
    in response to receiving the request, causing, by the co-processor, the at least two sensors to acquire data in the respective acquisition modes; and
    receiving, by the application processor, first sensor data acquired using a first sensor of the at least two sensors and second sensor data acquired using a second sensor of the at least two sensors.

12. The non-transitory computer readable memory of claim 11, wherein the functions further comprise:
    receiving, by the co-processor, the first sensor data and the second sensor data; and
    providing, by the co-processor, the first sensor data and the second sensor data to the application processor within a single data structure.

13. The non-transitory computer readable memory of claim 12, wherein the first sensor data comprises multiple intervals of data and the second sensor data comprises multiple intervals of data, and wherein the functions further comprise:
   determining, by the co-processor, timestamps associated with the multiple intervals of the first sensor data and timestamps associated with the multiple intervals of the second sensor data; and
   associating, by the co-processor and together within the single data structure, at least one interval of the multiple intervals of the first sensor data and at least one interval of the multiple intervals of the second sensor data based on the determined timestamps.

14. The non-transitory computer readable memory of claim 11, wherein the functions further comprise:
   determining, by the co-processor, one or more timestamps associated with the first sensor data and one or more time stamps associated with the second sensor data; and
   providing, by the co-processor and to the application processor, the one or more timestamps associated with the first sensor data and the one or more timestamps associated with the second sensor data.

15. The non-transitory computer readable memory of claim 11, wherein the plurality of acquisition modes comprise a free-running mode in which sensor data is captured independently of a time clock of the co-processor at a predetermined frequency and a triggered mode in which sensor data is captured at one or more predetermined times that are synchronized with the time clock of the co-processor.

16. The non-transitory computer readable memory of claim 15, wherein the functions further comprise causing the first sensor to switch acquisition modes in response to receiving a subsequent request for sensor data from the application processor, wherein the subsequent request identifies a new acquisition mode selected from among the plurality of acquisition modes.

17. A device comprising:
   an application processor configured to function based on an operating system;
   at least two sensors, wherein the at least two sensors are configured to acquire data using a plurality of acquisition modes; and
   a co-processor configured to receive data from the at least two sensors, and wherein the co-processor is configured to perform functions comprising:
      receiving, from the application processor, a request for sensor data, wherein the request identifies, for the at least two sensors, respective acquisition modes for acquiring data, the respective acquisition modes selected from among the plurality of acquisition modes,
      in response to receiving the request, causing the at least two sensors to acquire data in the respective acquisition modes,
      receiving first sensor data from a first sensor of the at least two sensors and second sensor data from a second sensor of the at least two sensors, and
      providing the first sensor data and the second sensor data to the application processor.

18. The device of claim 17, wherein the plurality of acquisition modes comprise a free-running mode in which sensor data is captured independently of a time clock of the co-processor at a predetermined frequency and a triggered mode in which sensor data is captured at one or more predetermined times that are synchronized with the time clock of the co-processor.

19. The device of claim 17, wherein the first sensor comprises a camera and the second sensor comprises a sensor selected from the group consisting of: an inertial measurement unit, an accelerometer, a gyroscope, a barometer, a magnetometer, and a temperature sensor.

20. The device of claim 17, wherein the functions further comprise causing the first sensor to switch acquisition modes in response to receiving a subsequent request for sensor data from the application processor, wherein the subsequent request identifies a new acquisition mode selected from among the plurality of acquisition modes.

* * * * *